US012423858B2

(12) United States Patent
Ulasen et al.

(10) Patent No.: US 12,423,858 B2
(45) Date of Patent: Sep. 23, 2025

(54) SYSTEMS AND METHODS FOR DETERMINING ENVIRONMENT DIMENSIONS BASED ON LANDMARK DETECTION

(71) Applicant: Acronis International GmbH, Schaffhausen (CH)

(72) Inventors: Sergey Ulasen, Singapore (SG); Vasyl Shandyba, Dnipro (UA); Alexander Snorkin, Dubai (AE); Artem Shapiro, Dnipro (UA); Andrey Adaschik, Sofia (BG); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 271 days.

(21) Appl. No.: 17/681,785

(22) Filed: Feb. 27, 2022

(65) Prior Publication Data
US 2022/0292712 A1    Sep. 15, 2022

Related U.S. Application Data

(60) Provisional application No. 63/160,146, filed on Mar. 12, 2021.

(51) Int. Cl.
*G06T 7/73* (2017.01)
*G06N 3/04* (2023.01)
(Continued)

(52) U.S. Cl.
CPC ............. *G06T 7/73* (2017.01); *G06N 3/04* (2013.01); *G06N 3/08* (2013.01); *G06T 7/60* (2013.01);
(Continued)

(58) Field of Classification Search
CPC ... G06T 7/73; G06T 7/60; G06T 2207/10016; G06T 2207/20076; G06T 2207/20081;
(Continued)

(56) References Cited

U.S. PATENT DOCUMENTS 10,671,878 B1 * 6/2020 Sarshogh .............. G06F 18/217
11,055,566 B1 * 7/2021 Pham ..................... G06V 10/82
(Continued)

*Primary Examiner* — John Villecco
*Assistant Examiner* — Han Hoang
(74) *Attorney, Agent, or Firm* — ArentFox Schiff LLP; Michael Fainberg

(57) ABSTRACT

Disclosed herein are systems and method for determining environment dimensions based on landmark detection, the method including: training, with a dataset including a plurality of images featuring an environment and labelled landmarks in the environment, a neural network to identify the labelled landmarks in an arbitrary image of the environment; receiving an input image depicting the environment; generating an input tensor based on the received input image; inputting the input tensor into the neural network, wherein the neural network is configured to generate an output tensor including a position of each identified landmark and a visibility score associated with each position; calculating a homography matrix between each position in the output tensor along a camera plane and a corresponding position in an environment plane, based on a pre-built model of the environment; and outputting an image that visually connects each landmark along the environment plane based on the homography matrix.

20 Claims, 4 Drawing Sheets

(51) Int. Cl.
*G06N 3/08* (2023.01)
*G06T 7/60* (2017.01)

(52) U.S. Cl.
CPC .............. *G06T 2207/10016* (2013.01); *G06T 2207/20076* (2013.01); *G06T 2207/20081* (2013.01); *G06T 2207/20084* (2013.01); *G06T 2207/30196* (2013.01); *G06T 2207/30228* (2013.01)

(58) Field of Classification Search
CPC . G06T 2207/20084; G06T 2207/30196; G06T 2207/30228; G06T 7/62; G06N 3/04; G06N 3/08; G06N 3/0464; G06N 3/09
See application file for complete search history.

(56) References Cited

U.S. PATENT DOCUMENTS

| | | | |
|---|---|---|---|
| 2017/0161911 A1* | 6/2017 | Kumar | G06T 7/246 |
| 2018/0096232 A1* | 4/2018 | Danielsson | G06N 3/084 |
| 2022/0038643 A1* | 2/2022 | López Felip | G06T 7/20 |
| 2022/0215201 A1* | 7/2022 | Dwivedi | G06N 3/045 |

\* cited by examiner

SYSTEMS AND METHODS FOR DETERMINING ENVIRONMENT DIMENSIONS BASED ON LANDMARK DETECTION

CROSS-REFERENCE TO RELATED APPLICATIONS

This application claims the benefit of U.S. Provisional Application No. 63/160,146, filed Mar. 12, 2021, which is herein incorporated by reference.

FIELD OF TECHNOLOGY

The present disclosure relates to the field of computer vision, and, more specifically, to systems and methods for determining environment dimensions based on landmark detection.

BACKGROUND

When localizing objects using computer vision and machine learning, object detection is usually described relative to the dimensions of the two-dimensional input image. For example, a detected object's location may be described as pixel coordinates. This information is useful, but not relevant if a user wants to know the object's location relative to the environment that the object is in. Consider an example where an input image is of a broadcast view of a soccer match. A user may be interested in identifying the players on the field and determining their location on the field (rather than on the image). In order to determine the location of the objects on the field, such as the players, the dimensions of the field are needed.

SUMMARY

In one exemplary aspect, the techniques described herein relate to a method for determining environment dimensions based on landmark detection, the method including: training, with a dataset including a plurality of images featuring an environment and labelled landmarks in the environment, a neural network to identify the labelled landmarks in an arbitrary image of the environment; receiving an input image depicting the environment; generating an input tensor based on the received input image; inputting the input tensor into the neural network, wherein the neural network is configured to generate an output tensor including a position of each identified landmark and a visibility score associated with each position; calculating a homography matrix between each position in the output tensor along a camera plane and a corresponding position in an environment plane, based on a pre-built model of the environment; and outputting an image that visually connects each landmark along the environment plane based on the homography matrix.

In some aspects, the techniques described herein relate to a method, further including: identifying an object in the input image; determining pixel coordinates of the object in the input image; and applying the homography matrix to convert the pixel coordinates to physical coordinates of the object in the environment.

In some aspects, the techniques described herein relate to a method, wherein the neural network includes: a convolutional backbone with feature extraction layers, and a regression head with fully connected layers.

In some aspects, the techniques described herein relate to a method, wherein the pre-built model of the environment is indicative of distances between each landmark in the environment.

In some aspects, the techniques described herein relate to a method, wherein the visibility score is a probability of whether a respective landmark is shown in a frame of the input image, and wherein the neural network is configured to determine a loss that is a linear combination of a mean absolute error for each identified landmark position and a cross entropy for point presence on the frame.

In some aspects, the techniques described herein relate to a method, wherein the neural network optimizes the loss using stochastic gradient descent.

In some aspects, the techniques described herein relate to a method, wherein the input image is a video frame of a livestream, and wherein the neural network determines environment dimensions in real-time.

In some aspects, the techniques described herein relate to a method, wherein the environment is a sports field and the labelled landmarks are locations on the sports field.

It should be noted that the methods described above may be implemented in a system comprising a hardware processor. Alternatively, the methods may be implemented using computer executable instructions of a non-transitory computer readable medium.

In some aspects, the techniques described herein relate to a system for determining environment dimensions based on landmark detection, the system including: a hardware processor configured to: train, with a dataset including a plurality of images featuring an environment and labelled landmarks in the environment, a neural network to identify the labelled landmarks in an arbitrary image of the environment; receive an input image depicting the environment; generate an input tensor based on the received input image; input the input tensor into the neural network, wherein the neural network is configured to generate an output tensor including a position of each identified landmark and a visibility score associated with each position; calculate a homography matrix between each position in the output tensor along a camera plane and a corresponding position in an environment plane, based on a pre-built model of the environment; and output an image that visually connects each landmark along the environment plane based on the homography matrix.

In some aspects, the techniques described herein relate to a non-transitory computer readable medium storing thereon computer executable instructions for determining environment dimensions based on landmark detection, including instructions for: training, with a dataset including a plurality of images featuring an environment and labelled landmarks in the environment, a neural network to identify the labelled landmarks in an arbitrary image of the environment; receiving an input image depicting the environment; generating an input tensor based on the received input image; inputting the input tensor into the neural network, wherein the neural network is configured to generate an output tensor including a position of each identified landmark and a visibility score associated with each position; calculating a homography matrix between each position in the output tensor along a camera plane and a corresponding position in an environment plane, based on a pre-built model of the environment; and outputting an image that visually connects each landmark along the environment plane based on the homography matrix.

The above simplified summary of example aspects serves to provide a basic understanding of the present disclosure.

This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for determining environment dimensions based on landmark detection. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
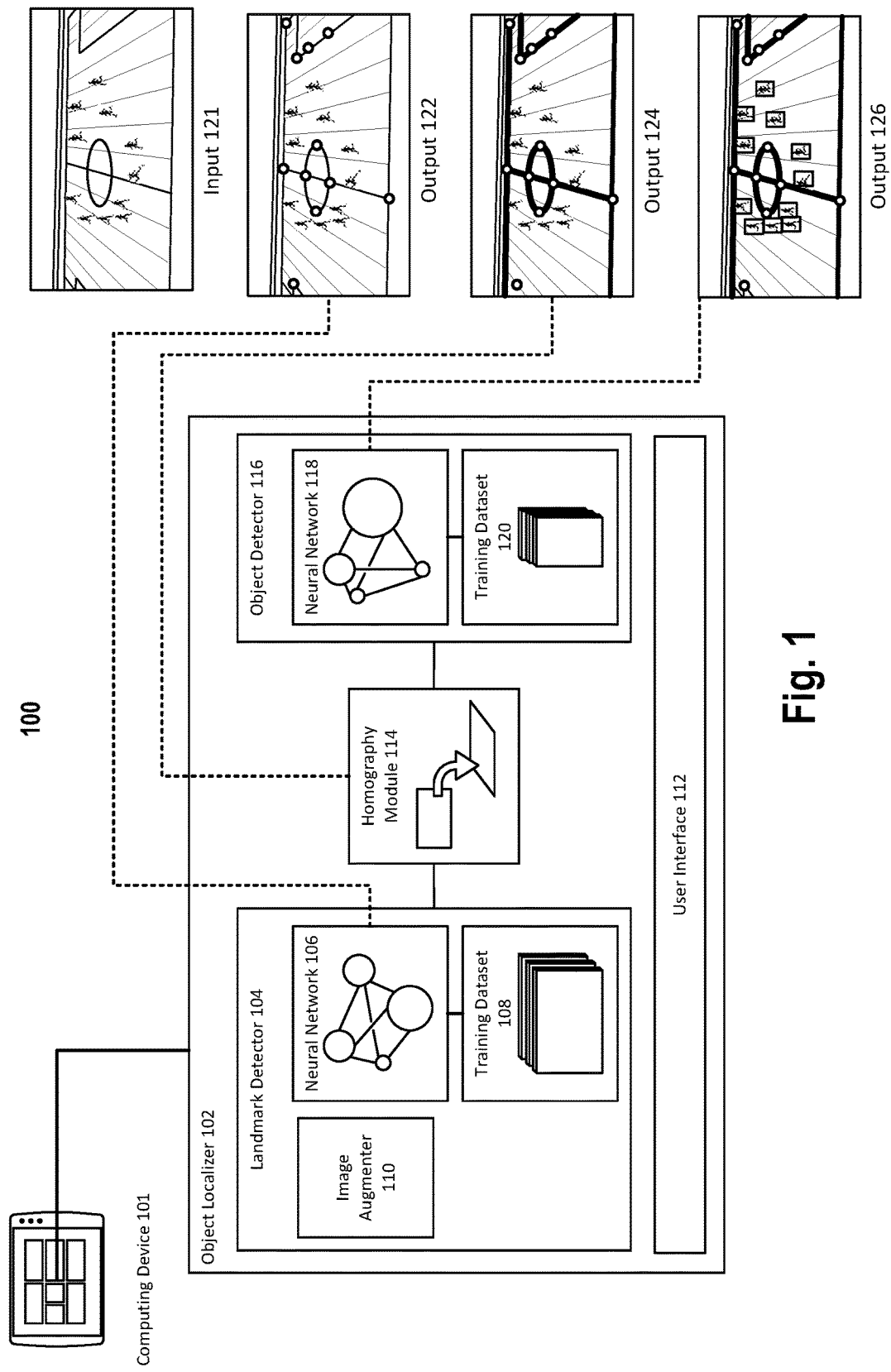
FIG. 1 is a block diagram illustrating a system for determining environment dimensions based on landmark detection.

FIG. 1 is a block diagram illustrating system 100 for determining environment dimensions based on landmark dimensions. In an exemplary aspect, system 100 includes computing device 101 (e.g., a server, a smartphone, etc.) that executes object localizer 102. Object localizer 102 may be a software that is configured to receive an input image and output a version of the input image that highlights the objects in the input image, identifies an environment in the input image, and/or provides locations of the objects relative to the environment.

Object localizer 102 comprises various modules including landmark detector 104, homography module 114, and object detector 116. User interface 112 accepts an input image and provides, via object localizer 102, an output image (e.g., one of outputs 122, 124, and 126 depending on the output the user wants). In some aspects, neural networks 106 and 118 and training datasets 108 and 120 may be stored on a different device than computing device 101. Computing device 101 may be a computer system (described in FIG. 4) such as a smartphone. If the neural networks 106 and 118 and/or training datasets 108 and 120 are stored on a different device (e.g., a server), computing device 101 may communicate with the different device to acquire information about the structure of the neural networks, code of neural networks, images in the training datasets, etc. This communication may take place over a network (e.g., the Internet). For example, object localizer 102 may be split into a thin client application and a thick client application. A user may provide an input image via user interface 112 on computing device 101. Interface 112, in this case, is part of the thin client. Subsequently, the input image may be sent to the different device comprising the thick client with the neural networks and the training datasets. Neural network 118 may yield output image 126 and transmit it to computing device 101 for output via user interface 112.

Landmark detector 104 comprises image augmenter 110, which is a module that receives an input image (e.g., depicting a soccer match broadcast frame) from user interface 112 and augments the input image for processing via neural network 106, which detects landmarks in the input image. For example, image augmenter 110 may convert the input image into a grayscale image, may crop the input image, rotate the input image, resize the input image, etc. Image augmenter 110 may also generate a tensor representation of the input image after any combination of augmentations.

Figure 2:
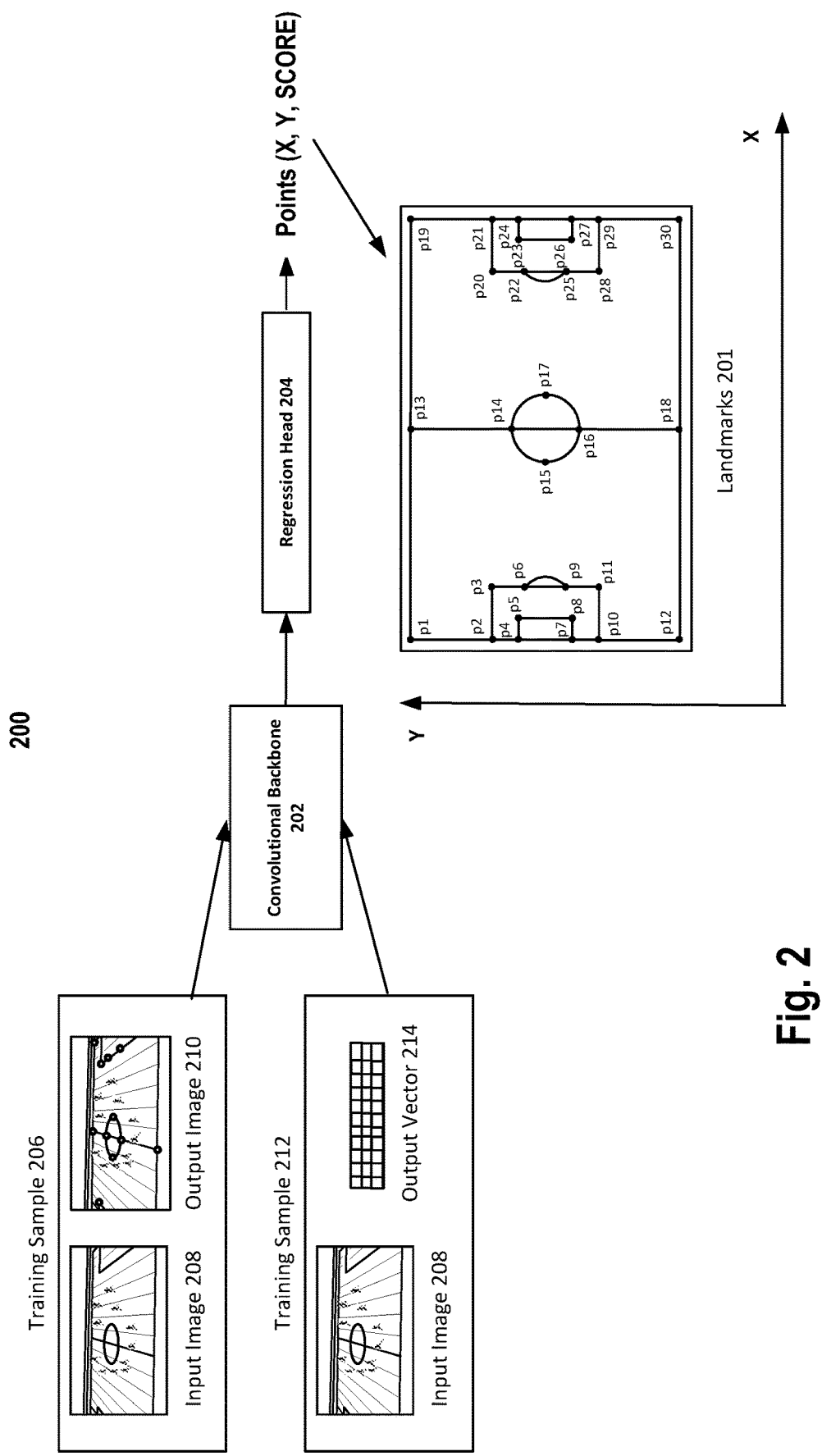
FIG. 2 is a block diagram illustrating an exemplary neural network structure.

FIG. 2 is a block diagram illustrating an exemplary neural network structure 200 (e.g., of neural network 106). Structure 200 comprises a convolutional neural network backbone 202. Backbone 202 includes the feature extraction layers that receive an input image and generate feature maps containing high-level summarized information. Example feature extraction layers may be convolutional and pooling layers. For example, backbone 202 may follow the structure of known image classifying neural networks such as Resnet, VGG-16, EfficientNet, etc.).

When passing the input image through neural network 106, output 122 may be generated. Neural network 106 may be trained using training dataset 108. Training dataset 108 may comprise a plurality of images depicting an environment and certain landmarks in the environment.

Consider an example in which the input image is a frame of a real-time video stream depicting multiple objects. This video steam may be of a soccer match and the multiple objects may include a soccer ball and humans (e.g., players, coaches, staff, fans, etc.). As shown in FIG. 1, the images may be a far-view of the soccer field (e.g., a broadcast view). Training dataset 120 may include a plurality of images, each depicting multiple objects. Training dataset 108 may include images of the environment (i.e., the soccer field) with labelled key points signifying landmarks.

For example, landmarks 201 in FIG. 2 contains 30 points (p1-p30) that, when connected, provide structure to the soccer field (e.g., the four points p14, p15, p16, p17 in the middle form a circle, the multiple points p12, p18, p30 along the edge of the field, etc.). These points are manually identified as landmarks in training images. A training sample for neural network 106 may take two formats. For example, the training sample may be training sample 206, which includes input image 208 and output image 210. Output image 210 includes annotated points in specific locations of input image 208. These points represent landmarks corresponding to landmarks 201. In another format, training sample 212 may include output vector 214 (used interchangeably with output tensor) of shape [N, 3]. N represents the number of landmark points that can potentially be identified. Following the example of a soccer field, where N equals 30, output vector 214 has the shape [30, 3]. This tensor has 30 rows (1 per key point) and 3 columns: x, y, score. Here, x and y represent coordinates of a point on frame, and the score is a visibility score that represents an indication (e.g., a probability) that the key point is visible on the image. If the score is less than a predetermined threshold (e.g., 0), the point is considered to be outside of the visible portion of the environment. In output image 210, only 11 of the 30 landmarks are identified. The remaining 19 are outside of the visible portion of the soccer field. A corresponding output vector 214 may be organized as:

TABLE 1

Data inside Output Vector/Tensor

| Landmark Points | P1 | P2 | P3 | P4 | P5 | ... | P14 | P15 | P16 | P17 | ... | P27 | P28 | P29 | P30 |
|---|---|---|---|---|---|---|---|---|---|---|---|---|---|---|---|
| X | 0 | 0 | 100 | 0 | 0 | ... | 500 | 400 | 500 | 600 | ... | 0 | 0 | 0 | 0 |
| Y | 0 | 0 | 800 | 0 | 0 | ... | 600 | 500 | 400 | 500 | ... | 0 | 0 | 0 | 0 |
| Score | −1 | −1 | 1 | −1 | −1 | ... | 1 | 1 | 1 | 1 | ... | −1 | −1 | −1 | −1 |

Here, the x and y coordinates represent pixel values. For example, point p14 has coordinates (500, 600) signifying a pixel that is 500 pixels from the left most pixel of input image 208 and 600 pixels from the bottom most pixel of input image 208. For points that have coordinates (0,0), the point is off of the image. For example, point p1 has coordinates (0, 0) and referring to landmarks 201 and output image 210, it can be seen that point p1 is not visible in input image 208. Accordingly, points that are not visible in input image 208 have a score of −1 and points that are visible have a score of 1. In this case, the predetermined threshold is 0.

Neural network 106 may receive a plurality of training samples such as training sample 212 and learn features associated with each point of landmarks 201. Because each input image 208 includes a different view of the environment, some points may be visible while others may not be visible. In some images, all points may be visible. Based on the relative positions of each point, neural network 106 may be trained to estimate an output vector 214 for any given input image.

On a more technical level, in neural network 106, convolutional backbone 202 extracts features from an input image. These features are sent to regression head 204, which outputs the output tensor. There are three types of key points for each image: (1) key points outside the frame for which coordinates are not labeled, (2) key points inside the frame for which coordinates are labeled, and (3) key points outside frame for which coordinates are labeled. The third type appears during augmentation.

Neural network 106 computes a regression loss for key points of type two and three. For example, for key points inside the frame that are labelled, mean absolute error (MAE) is calculated such that L_inside_has_label(y, y_true)= abs(y−y_true). For key points outside the frame that are labelled, MAE is calculated such that L_outside_has_label(y, y_true)=abs(y−y_true).

There is also a classification performed by neural network 106 to determine the probability of a key point being inside the frame:

L_classification=CrossEntropy(p,inside_
    mask)=−(inside_mask*log(p)+(1−inside_
    mask)*log(1−p))

Neural network 106 calculates loss such that:

Loss=L_inside_has_label+alpha_outside_has_
    label*L_outside_has_label+alpha_
    inside_crossentropy*L_classification In some aspects, this loss is minimized using an optimizer such as stochastic gradient descent (e.g., Adam optimization algorithm).

The output of neural network 106 may be a visual output (e.g., output 122) with highlighted landmarks or a numerical output (e.g., a tensor of size [N, 3]). When the output is numerical, the tensor may be input into homography module 114. Homography module 114 creates the structure of the environment for which landmarks were identified. Homography module 114 may have environment models that indicate the distance between landmarks. For example, homography module 114 may store a soccer field model shown in FIG. 2 (referring to landmarks 201), which lists the distances between the key points. Homography module 114 may then calculate a homography matrix between key points on a camera plane and the same key points on a field plane. Using the calculated homography and the environment models, any point from the camera plane can be transformed into an environment plane. Homography module 114 thus outputs output 124, which connects the key points in the field plane.

For example, in a standard soccer field, p13 may be 50 yards away from p19, and p13 may be 70 yards away from p18. Given a plurality of such measurements, homography module 114 may map the pixel coordinates listed in table 1 to physical coordinates in a soccer field. For example, pixel coordinates (500, 500) may represent physical coordinates (50 yds, 35 yds). Because the camera angle for each image may be different, one cannot simply make a rigid one-to-one mapping of pixel coordinates and physical coordinates. Any warping, tilting, zooming, etc., captured in input image 208 needs to be properly mapped from the camera plane to a physical/field plane.

In some aspects, a different homography matrix is determined by homography module 114 for each different camera in the environment. For example, in a broadcast of a soccer match, there may be multiple different cameras situated in different locations of the soccer arena. Landmark detector 104 may be used in a warm-up period to learn where landmarks are located in a given soccer field. Likewise, homography module 114 may determine a homography matrix based on the images provided by the specific camera. Subsequent to identifying the landmarks and determining the homography matrix, neural network 118 is configured to detect objects and have homography module 114 convert the pixel coordinates of the detected objects to physical coordinates using the homography matrix. For a different camera at a different position, this homography matrix will be different because the camera perspective is not identical.

In some aspects, after identifying the environment dimensions, via homography, object detector 116 is used to identify objects in the environment. Object detector 116 comprises neural network 118 and training dataset 120 in memory. Neural network 118 may be an image classifier that identifies an object in an image and outputs a label. Neural network 118 may also be an image classifier that identifies an object in an image and generates a boundary around the object. In some aspects, generating the boundary around the object further comprises determining pixel coordinates of the object in the image. For example, the object may be a player that is identified by neural network 118. Neural network 118 may generate the coordinates (500, 300). These coordinates may represent the center point of the boundary box generated around the identified player (i.e., the center point is a pixel that is 500 pixels away from the left-most pixel and 300 pixels above the bottom-most pixel). Subsequent to detecting objects in the image (e.g., players), homography module 114 may determine a position of the object in the environment plane (convert from the field plane). For example, homography module 114 may apply the homography matrix used to convert pixel coordinates to physical coordinates—taking input (500, 300) and outputting (50 yds, 45 yds). Homography module 114 then outputs output image 126, which identifies object positions in the physical environment plane.

Figure 3:
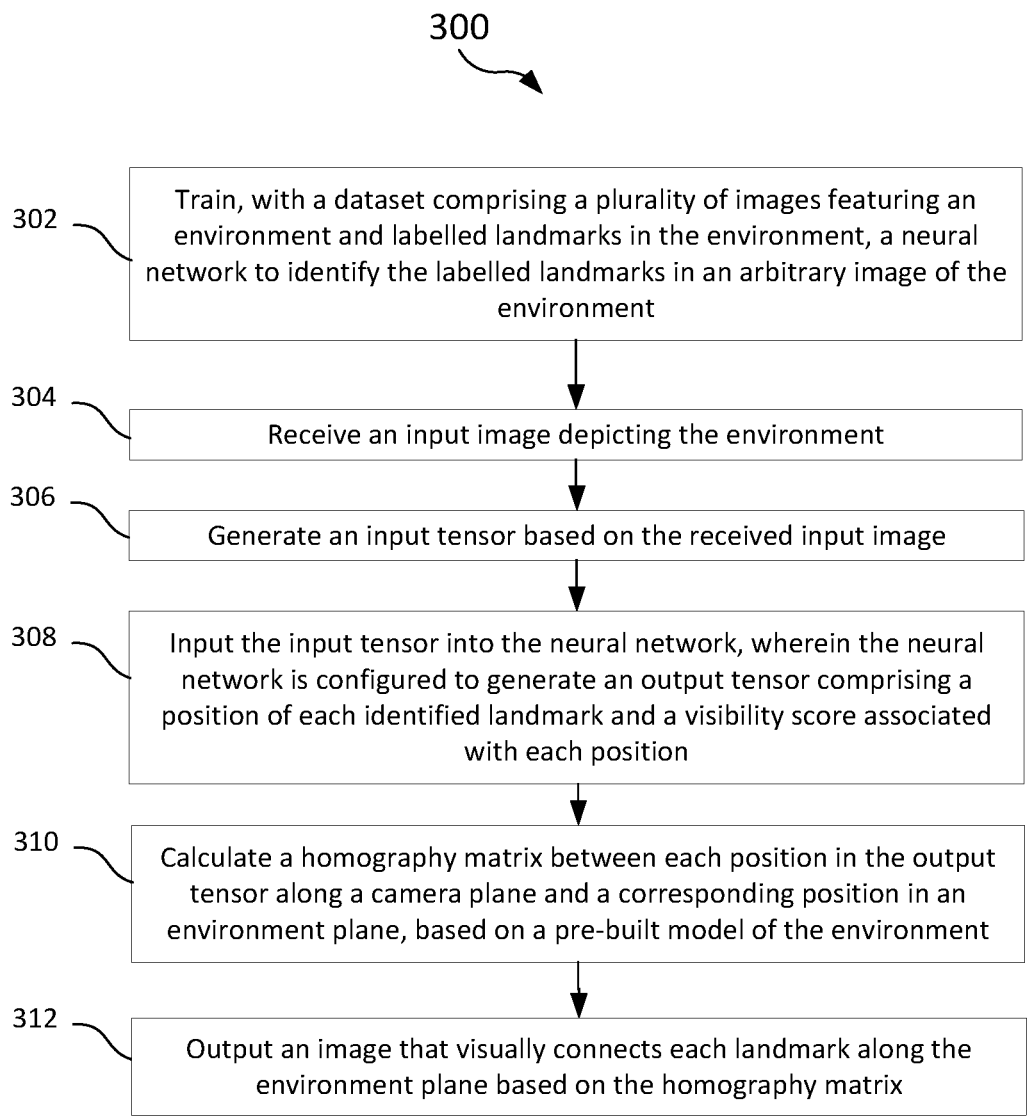
FIG. 3 illustrates a flow diagram of a method for determining environment dimensions based on landmark detection.

FIG. 3 illustrates a flow diagram of method 300 for determining environment dimensions based on landmark detection. At 302, object localizer 102 trains, with a dataset (e.g., training dataset 108) comprising a plurality of images featuring an environment and labelled landmarks in the environment (e.g., landmarks 201), a neural network (e.g., neural network 106) to identify the labelled landmarks in an arbitrary image of the environment. In some aspects, the neural network comprises a convolutional backbone with feature extraction layers and a regression head with fully connected layers.

At 304, object localizer 102 receives (e.g., via user interface 112) an input image depicting the environment. At 306, object localizer 102 generates (e.g., via image augmenter 110) an input tensor based on the received input image. At 308, object localizer 102 inputs the input tensor into the neural network, wherein the neural network is configured to generate an output tensor comprising a position of each identified landmark and a visibility score associated with each position. In some aspects, the visibility score is a probability of whether a respective landmark is shown in a frame of the input image. In some aspects, the neural network is configured to determine a loss that is a linear combination of a mean absolute error for each identified landmark position and a cross entropy for point presence on the frame. This loss may be optimized using stochastic gradient descent.

At 308, object localizer 102 calculates (e.g., via homography module 114) a homography matrix between each position in the output tensor along a camera plane and a corresponding position in an environment plane, based on a pre-built model of the environment. In some aspects, the pre-built model of the environment is indicative of distances between each landmark in the environment. At 310, object localizer 102 outputs an image that visually connects each landmark along the environment plane based on the homography matrix.

Figure 4:
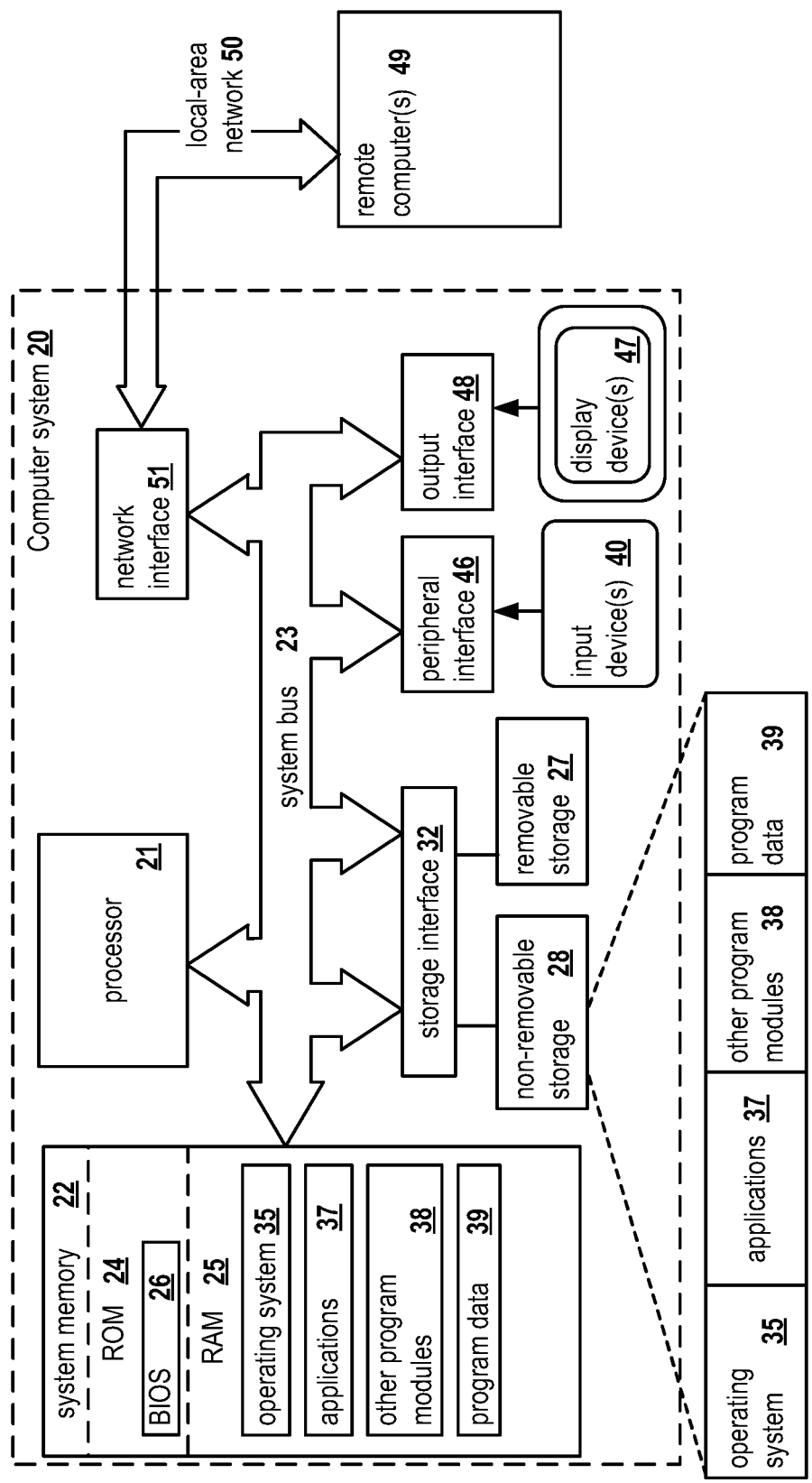
FIG. 4 presents an example of a general-purpose computer system on which aspects of the present disclosure can be implemented.

FIG. 4 is a block diagram illustrating a computer system 20 on which aspects of systems and methods for determining environment dimensions based on landmark detection may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for determining environment dimensions based on landmark detection, the method comprising:
    training, with a dataset comprising a plurality of images featuring an environment and labelled landmarks in the environment, a neural network to identify the labelled landmarks in an arbitrary image of the environment;
    receiving an input image depicting the environment;
    generating an input tensor based on the received input image;
    inputting the input tensor into the neural network, wherein the neural network is configured to generate an output tensor comprising a position of each identified landmark and a visibility score associated with each position, wherein the visibility score is a probability of whether a respective landmark is shown in a frame of the input image, and wherein a respective visibility score of a respective identified landmark that is less than a predetermined threshold score is indicative of the respective identified landmark being outside a visible portion of the environment as captured in the frame, and wherein the neural network is configured to label relative positions outside of the input image for landmarks with visibility scores less than the predetermined threshold score;
    calculating a homography matrix between each position in the output tensor along a camera plane and a corresponding position in an environment plane, based on a pre-built model of the environment and visibility scores in the output tensor; and
    outputting an image that visually connects each landmark along the environment plane based on the homography matrix.

2. The method of claim 1, further comprising:
    identifying an object in the input image;
    determining pixel coordinates of the object in the input image; and
    applying the homography matrix to convert the pixel coordinates to physical coordinates of the object in the environment.

3. The method of claim 1, wherein the neural network comprises:
    a convolutional backbone with feature extraction layers, and
    a regression head with fully connected layers.

4. The method of claim 1, wherein the pre-built model of the environment is indicative of distances between each landmark in the environment.

5. The method of claim 1, wherein the neural network is configured to determine a loss that is a linear combination of a mean absolute error for each identified landmark position and a cross entropy for point presence on the frame.

6. The method of claim 5, wherein the neural network optimizes the loss using stochastic gradient descent.

7. The method of claim 1, wherein the input image is a video frame of a livestream, and wherein the neural network determines environment dimensions in real-time.

8. The method of claim 1, wherein the environment is a sports field and the labelled landmarks are locations on the sports field.

9. A system for determining environment dimensions based on landmark detection, the system comprising:
    a hardware processor configured to:
        train, with a dataset comprising a plurality of images featuring an environment and labelled landmarks in the environment, a neural network to identify the labelled landmarks in an arbitrary image of the environment;
        receive an input image depicting the environment;
        generate an input tensor based on the received input image;
        input the input tensor into the neural network, wherein the neural network is configured to generate an output tensor comprising a position of each identified landmark and a visibility score associated with each position, wherein the visibility score is a probability of whether a respective landmark is shown in a frame of the input image, and wherein a respective visibility score of a respective identified landmark that is less than a predetermined threshold score is indicative of the respective identified landmark being outside a visible portion of the environment as captured in the frame, and wherein the neural network is configured to label relative positions outside of the input image for landmarks with visibility scores less than the predetermined threshold score;
        calculate a homography matrix between each position in the output tensor along a camera plane and a corresponding position in an environment plane, based on a pre-built model of the environment and visibility scores in the output tensor; and
        output an image that visually connects each landmark along the environment plane based on the homography matrix.

10. The system of claim 9, wherein the hardware processor is further configured to:
    identify an object in the input image;
    determine pixel coordinates of the object in the input image; and
    apply the homography matrix to convert the pixel coordinates to physical coordinates of the object in the environment.

11. The system of claim 9, wherein the neural network comprises:
    a convolutional backbone with feature extraction layers, and
    a regression head with fully connected layers.

12. The system of claim 9, wherein the pre-built model of the environment is indicative of distances between each landmark in the environment.

13. The system of claim 9, wherein the neural network is configured to determine a loss that is a linear combination of a mean absolute error for each identified landmark position and a cross entropy for point presence on the frame.

14. The system of claim 13, wherein the neural network optimizes the loss using stochastic gradient descent.

15. The system of claim 9, wherein the input image is a video frame of a livestream, and wherein the neural network determines environment dimensions in real-time.

16. The system of claim 9, wherein the environment is a sports field and the labelled landmarks are locations on the sports field.

17. A non-transitory computer readable medium storing thereon computer executable instructions for determining environment dimensions based on landmark detection, including instructions for:
    training, with a dataset comprising a plurality of images featuring an environment and labelled landmarks in the environment, a neural network to identify the labelled landmarks in an arbitrary image of the environment;

receiving an input image depicting the environment;

generating an input tensor based on the received input image;

inputting the input tensor into the neural network, wherein the neural network is configured to generate an output tensor comprising a position of each identified landmark and a visibility score associated with each position, wherein the visibility score is a probability of whether a respective landmark is shown in a frame of the input image, and wherein a respective visibility score of a respective identified landmark that is less than a predetermined threshold score is indicative of the respective identified landmark being outside a visible portion of the environment as captured in the frame, and wherein the neural network is configured to label relative positions outside of the input image for landmarks with visibility scores less than the predetermined threshold score;

calculating a homography matrix between each position in the output tensor along a camera plane and a corresponding position in an environment plane, based on a pre-built model of the environment and visibility scores in the output tensor; and outputting an image that visually connects each landmark along the environment plane based on the homography matrix.

18. The non-transitory computer readable medium of claim 17, further comprising instructions for:

identifying an object in the input image;

determining pixel coordinates of the object in the input image; and applying the homography matrix to convert the pixel coordinates to physical coordinates of the object in the environment.

19. The non-transitory computer readable medium of claim 17, wherein the neural network comprises:

a convolutional backbone with feature extraction layers, and a regression head with fully connected layers.

20. The non-transitory computer readable medium of claim 17, wherein the pre-built model of the environment is indicative of distances between each landmark in the environment.

* * * * *